United States Patent Office 3,240,757
Patented Mar. 15, 1966

3,240,757
COPOLYMERS OF 3,3,3 - TRIFLUORO - 2 - TRI-
FLUOROMETHYL PROPENE AND VINYL
MONOMERS
George B. Sterling, Midland, Mich., assignor to The Dow
Chemical Company, Midland, Mich., a corporation of
Delaware
No Drawing. Filed Apr. 26, 1961, Ser. No. 105,569
14 Claims. (Cl. 260—63)

This invention relates to copolymers of 3,3,3-trifluoro-2-trifluoromethyl propene and certain ethylenically unsaturated monomers copolymerizable therewith. It relates more particularly to fluorine-containing elastomeric and resinous polymeric compositions and the method for their manufacture.

Fluorine-containing copolymers or copolymeric compositions have been found to possess many useful applications by reason of their chemical inertness and solvent resistance, and they can be fabricated into a wide variety of useful articles having improved chemical and physical stability or in the form of protective coatings on the surfaces of a wide variety of useful articles. In connection with these uses it is often desirable for the fluorine-containing copolymers to possess elastomeric properties as well as good resistance to impact, high tensile strength and when employed as protective coatings to be easily dissolved in a wide variety of commercially available solvents.

It has now been discovered that copolymers of 3,3,3-trifluoro-2-trifluoromethyl propene and certain ethylenically unsaturated monomers such as vinyl esters, vinyl aromatic compounds, vinyl ethers, vinyl halides, vinyl ketones, esters of acrylic and methacrylic acids and conjugated diolefins such as isoprene dimethylbutadiene and butadiene-1,3, can readily be prepared by polymerizing a mixture of the 3,3,3-trifluoro-2-trifluoromethyl propene and one or more of such ethylenically unsaturated monomers in an aqueous emulsion in the presence of a polymerization catalyst, as more fully hereinafter described.

The 3,3,3-trifluoro-2-trifluoromethyl propene starting material has the empirical formula $(CF_3)_2C:CH_2$, and may alternatively be named 1,1,1,3,3,3-hexafluoroisobutene. It can be prepared by procedure described in J. Chem. Soc. (London), page 3567, 1953. In brief, 1,1,1,3,3,3-hexafluoro-2-methylpropane is mildly chlorinated to produce $(CF_3)_2CH \cdot CH_2Cl$, which compound is dehydrochlorinated with potassium hydroxide-ethyl alcohol solution to produce the 3,3,3-trifluoro-2-trifluoromethyl propene of the formula $(CF_3)_2C:CH_2$.

The monomers to be copolymerized with the 3,3,3-trifluoro-2-trifluoromethyl propene in preparing the new copolymeric compositions of the invention are vinyl esters, vinyl ethers, vinyl halides, vinyl aromatic compounds, acrylic and methacrylic acid esters, vinyl ketones, and conjugated diolefins. Examples of suitable vinyl esters are vinyl acetate, vinyl propionate, vinyl butyrate, vinyl hexanoate, vinyl octanoate, vinyl 2-ethylhexoate, vinyl pelargonate, vinyl laurate, vinyl benzoate and vinyl stearate. Examples of suitable vinyl ethers are vinyl methyl ether, vinyl ethyl ether, vinyl propyl ether, vinyl butyl ether, vinyl 2-ethylhexyl ether, and vinyl isobutyl ether. The vinyl halides can be vinyl chloride, vinyl fluoride or vinyl bromide. The vinyl ketones can be vinyl methyl ketone, methyl isopropenyl ketone and the like. Examples of suitable vinyl aromatic compounds are the monovinyl aromatic hydrocarbons and nuclear halogenated monovinyl aromatic hydrocarbons such as styrene, vinyltoluene, vinylxylene, ethylvinylbenzene, isopropylstyrene, tert.-butylstyrene, chlorostyrene, dichlorostyrene, fluorostyrene, and ar-chlorovinyltoluene. The conjugated diolefins can be butadiene, dimethylbutadiene or isoprene. Mixtures of any two or more of such ethylenically unsaturated monomers can also be used, to prepare copolymeric compositions consisting of two, three, four or more of the monomers copolymerized or interpolymerized with the 3,3,3-trifluoro-2-trifluoromethylpropene. Copolymers of 3 or more of the monomers are preferably copolymers produced from the polymerization of monomeric mixtures containing the 3,3,3-trifluoro-2-trifluoromethylpropene, a vinyl ester and one or more of the other monomers indicated above.

The polymeric compositions of the invention are copolymers produced from monomeric mixtures containing between about 10 and about 90 percent by weight of 3,3,3-trifluoro-2-trifluoromethylpropene and correspondingly from 90 to 10 percent by weight of one or more of the other monomers. In producing polymeric compositions from the aforementioned monomeric mixtures, it is found that the finished copolymeric product contains between about 2 and about 65 weight percent of 3,3,3-trifluoro-2-trifluoromethylpropene copolymerized or interpolymerized with the other monomeric starting materials.

The copolymeric compositions are preferably prepared by polymerizing the mixture of monomers in an aqueous emulsion in the presence of a polymerization catalyst such as per-oxygen compounds, or per-salts, e.g. potassium persulfate, sodium persulfate, ammonium persulfate, benzoyl peroxide, tert.-butylperoxide, lauroyl peroxide, dicumyl peroxide or under the influence of high energy ionizing radiation such as gamma rays, X-rays or high speed electrons, and at temperatures between about 40° and 150° C., preferably from about 60 to 120° C., under a pressure at least as great as the autogenous pressure of the mixture of the materials.

The polymerization reaction is preferably conducted under neutral to alkaline conditions, e.g. in aqueous emulsions at a pH value between 7 and 11, employing suitable buffer agents, if desired.

In practice, the monomers, together with an aqueous solution containing a suitable emulsifying agent, catalyst and buffering agent is placed in a pressure resistant vessel or autoclave and heated in the closed vessel while agitating the mixture until the monomers or at least a substantial proportion of the monomers are polymerized. Thereafter, the vessel is cooled, the pressure is released and the latex is preferably heated or steam distilled to remove and separate unreacted monomers. The product or copolymer is recovered in usual ways such as by coagulating the latex, filtering, washing and drying the product.

The following examples illustrate ways in which the principle of the invention has been applied, but are not to be construed as limiting its scope.

EXAMPLE 1

In each of a series of experiments, a mixture of 3,3,3-trifluoro-2-trifluoromethylpropene and vinyl propionate in proportions as stated in the following table, together with an aqueous solution, was sealed in a pressure resistant glass bottle and agitated to form an aqueous emulsion employing the recipe:

| Ingredients: | Parts by wt. |
|---|---|
| Monomers | 100 |
| Water | 110 |
| Sodium lauryl sulfate | 0.85 |
| Sodium bicarbonate | 1.0 |
| Potassium persulfate | 0.75 |

The emulsion was heated in the closed bottle with agitating at a temperature of 60° C. for a period of 72 hours. Thereafter, the bottle was cooled and opened. The copolymer latex was removed and was heated to temperatures between about 98°–100° C. while bubbling steam therethrough to remove unreacted monomer. The copolymer was recovered by coagulating the latex and separating, washing and drying the coagulum. The copolymer was analyzed to determine the proportion of 3,3,3-trifluoro-2-trifluoromethyl propene chemically combined therein. Other portions of the copolymer were compression molded at temperatures of about 170° C. and about 200 pounds per square inch gauge pressure and the molded product observed for its physical properties. The copolymer was also tested for its solubility in a number of organic solvents. Table I identifies the experiments and gives the proportion of monomers in the starting materials. The table also given the proportions of said monomers chemically combined or interpolymerized in the copolymer product. In the table the empirical formula $C_4H_2F_6$ is employed to designate 3,3,3-trifluoro-2-trifluoromethylpropene, for brevity.

*Table I*

| Run No. | Monomers | | Conversion, percent | Copolymer product | | Remarks |
| --- | --- | --- | --- | --- | --- | --- |
| | $C_4H_2F_6$, percent | Vinyl propionate, percent | | $C_4H_2F_6$, percent | Vinly propionate, percent | |
| 1 | 90 | 10 | 24 | 62 | 38 | Clear, soft, flexible. |
| 2 | 75 | 25 | 56 | 16 | 84 | Clear, hard, brittle. |
| 3 | 50 | 50 | 100 | 50 | 50 | Clear, soft, flexible. |
| 4 | 10 | 90 | 100 | 14 | 86 | Clear, very soft. |

All of the copolymers were soluble in carbon tetrachloride, toluene and methyl isobutyl ketone. They were insoluble in ethyl alcohol and hexane.

EXAMPLE 2

In each of a series of experiments, a mixture of 3,3,3-trifluoro-2-trifluoromethylpropene and styrene in proportions as stated in the following table was polymerized employing the procedure and recipe employed in Example 1. Table II identifies the experiments and gives the results obtained.

*Table II*

| Run No. | Monomers | | Conversion, percent | Copolymer product | | Remarks |
| --- | --- | --- | --- | --- | --- | --- |
| | $C_4H_2F_6$, percent | Styrene, percent | | $C_4H_2F_6$, percent | Styrene, percent | |
| 1 | 90 | 10 | 29 | 17 | 83 | Clear, hard, stiff. |
| 2 | 50 | 50 | 56 | 13 | 87 | Do. |
| 3 | 10 | 90 | 91 | 7 | 93 | Do. |

All of the copolymers were soluble in carbon tetrachloride, methyl ethyl ketone and toluene, but were insoluble in ethyl alcohol.

EXAMPLE 3

In each of a series of experiments, a mixture of 3,3,3-trifluoro-2-trifluoromethylpropene and ethyl vinyl ether in proportions as stated in the following table was polymerized employing the procedure and recipe employed in Example 1. Table III identifies the experiments and gives the results obtained.

*Table III*

| Run No. | Monomers | | Conversion, percent | Copolymer product | | Remarks |
| --- | --- | --- | --- | --- | --- | --- |
| | $C_4H_2F_6$, percent | Ethyl vinyl Ether, percent | | $C_4H_2F_6$, percent | Ethyl vinyl Ether, percent | |
| 1 | 90 | 10 | 22 | 12 | 88 | Yellow, hard. |
| 2 | 50 | 50 | 29 | 59 | 41 | Clear, hard. |
| 3 | 10 | 90 | 23 | 31 | 69 | Clear, very soft. |

All of the copolymers were insoluble in carbon tetrachloride, ethyl alcohol, methyl ethyl ketone and toluene.

EXAMPLE 4

In each of a series of experiments, a mixture of 3,3,3-trifluoro-2-trifluoromethylpropene and another monomer in kind and in proportions as stated in the following table was polymerized in an aqueous emulsion to form a copolymer, employing procedure and receipe similar to that employed in Example 1. Table IV identifies the experiments and gives the results obtained.

Table IV

| Run No. | Monomers | | | Conversion, percent | Copolymer product | |
|---|---|---|---|---|---|---|
| | $C_4H_2F_6$, percent | Other monomer | | | $C_4H_2F_6$, percent | Remarks |
| | | Kind | Percent | | | |
| 1 | 50 | Ethyl acrylate | 50 | 56 | 6 | Clear, soft, flexible. |
| 2 | 50 | Methyl isopropenyl ketone. | 50 | 40 | 3 | Lt. yellow, hard, soft. |
| 3 | 10 | Vinyl chloride | 90 | 88 | 5 | Clear, hard, stiff. |
| 4 | 50 | ____do____ | 50 | 95 | 43 | Do. |
| 5 | 40 | Dichlorostyrene | 60 | 56 | 4 | Clear, hard, brittle. |

EXAMPLE 5

In each of a series of experiments a mixture of 3,3,3-trifluoro-2-trifluoromethylpropene, vinyl propionate and another monomer of a kind and in proportions as stated in the following table was polymerized employing the procedure and recipe employed in Example 1. Table V identifies the experiments and gives the results obtained.

Table V

| Run No. | Monomers | | | | Conversion, percent | Copolymer product | |
|---|---|---|---|---|---|---|---|
| | $C_4H_2F_6$, percent | Vinyl propionate, percent | Other monomer | | | $C_4H_2F_6$, percent | Remarks |
| | | | Kind | Percent | | | |
| 1 | 50 | 25 | Styrene | 25 | 34 | 17 | Clear, hard.[a] |
| 2 | 50 | 25 | Methyl isopropenyl ketone. | 25 | 28 | 7 | Yellow, hard.[b] |
| 3 | 50 | 25 | Ethyl acrylate | 25 | 93 | 37 | Clear, soft, flexible.[c] |
| 4 | 50 | 25 | Ethyl vinyl ether. | 25 | 42.5 | 44 | Clear, soft, flexible.[d] |

[a] Soluble in carbon tetrachloride and toluene.
[b] Soluble in methyl ethyl ketone and toluene.
[c] Soluble in carbon tetrachloride and toluene.
[d] Insoluble in carbon tetrachloride, methyl ethyl ketone and toluene.

EXAMPLE 6

In each of a series of experiments, a mixture of 3,3,3-trifluoro-2-trifluoromethylpropene and butadiene, together with or without other monomers, in proportions as stated in the following table was polymerized in an aqueous emulsion employing the procedure and recipe employed in Example 1. Table VI identifies the experiments, and gives the results obtained.

Table VI

| Run No. | Monomers | | | | Conversion, percent | Copolymer product | |
|---|---|---|---|---|---|---|---|
| | $C_4H_2F_6$, percent | Butadiene, percent | Other monomer | | | $C_4H_2F_6$, percent | Remarks |
| | | | Kind | Percent | | | |
| 1 | 90 | 10 | None | | 23 | 45 | Clear, very soft, flexible. |
| 2 | 10 | 90 | ____do____ | | 84 | 8 | Do. |
| 3 | 50 | 25 | Vinyl propionate. | 25 | 100 | 52 | Clear, soft, flexible. |
| 4 | 10 | 45 | ____do____ | 45 | 40 | 10 | Do. |
| 5 | 70 | 15 | ____do____ | 15 | 38 | 58 | Do. |
| 6 | 50 | 25 | Vinyl chloride | 25 | 52 | 43 | Do. |
| 7 | 50 | 20 | {Styrene / Vinyl propionate. | 20 / 10 | 27 | 31 | Do. |

I claim:

1. A copolymer of from about 2 to about 65 percent by weight of 3,3,3-trifluoro-2-trifluoromethylpropene and correspondingly from 98 to 35 percent by weight of at least one monomer selected from the group consisting of (a) vinyl esters having the general formula:

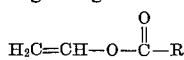

wherein R represents a lower alkyl radical containing from 1 to 7 carbon atoms, (b) vinyl ethers having the general formula:

$$H_2C=CH-O-R_1$$

wherein $R_1$ represents an alkyl radical containing from 2 to 4 carbon atoms, (c) vinyl aromatic compounds having the general formula:

$$H_2C=CH-R_2$$

wherein $R_2$ represents a member of the group consisting of an aromatic hydrocarbon and a nuclear halogenated aromatic hydrocarbon radical of the benzene series, (d) vinyl halides having the general formula:

$$H_2C=CH-R_3$$

wherein $R_3$ represents a halogen atom selected from the group consisting of chlorine, bromine and fluorine, (e) vinyl ketones having the general formula:

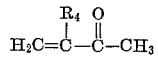

wherein $R_4$ represents a member of the group consisting of hydrogen and the methyl radical, and (f) esters of acrylic acid having the general formula:

$$H_2C=CH-\overset{O}{\underset{\|}{C}}-O-R_5$$

wherein $R_5$ represents a lower alkyl radical containing from 1 to 8 carbon atoms.

2. A copolymer of from 2 to 65 percent by weight of 3,3,3-trifluoro-2-trifluoromethylpropene and from 98 to 35 percent by weight of a vinyl ester having the general formula:

$$H_2C=CH-O-\overset{O}{\underset{\|}{C}}-R$$

wherein R represents a lower alkyl radical containing from 1 to 7 carbon atoms.

3. A copolymer according to claim 2, wherein the vinyl ester is vinyl propionate.

4. A copolymer of from 2 to 65 percent by weight of 3,3,3-trifluoro-2-trifluoromethylpropene and from 98 to 35 percent by weight of a vinyl ether having the general formula:

$$H_2C=CH-O-R_1$$

wherein $R_1$ represents an alkyl radical containing from 2 to 4 carbon atoms.

5. A copolymer according to claim 4, wherein the vinyl ether is ethyl vinyl ether.

6. A copolymer of from 2 to 65 percent by weight of 3,3,3-trifluoro-2-trifluoromethylpropene and from 98 to 35 percent by weight of a vinyl aromatic hydrocarbon having the general formula:

$$H_2C=CH-R_2$$

wherein $R_2$ represents an aromatic hydrocarbon radical of the benzene series.

7. A copolymer according to claim 6, wherein the vinyl aromatic hydrocarbon is styrene.

8. A copolymer of from 2 to 65 percent by weight of 3,3,3-trifluoro-2-trifluoromethylpropene and from 98 to 35 percent by weight of a vinyl halide having the general formula:

$$H_2C=CH-R_3$$

wherein $R_3$ represents a halogen selected from the group consisting of chlorine, bromine and fluorine.

9. A copolymer according to claim 8, wherein the vinyl halide is vinyl chloride.

10. A copolymer of from 2 to 65 percent by weight of 3,3,3-trifluoro-2-trifluoromethylpropene and from 98 to 35 percent by weight of a vinyl ketone having the general formula:

$$H_2C=\overset{R_4}{\underset{|}{C}}-\overset{O}{\underset{\|}{C}}-CH_3$$

wherein $R_4$ represents a member of the group consisting of hydrogen and the methyl radical.

11. A copolymer according to claim 10, wherein the vinyl ketone is methyl isopropenyl ketone.

12. A copolymer of from 2 to 65 percent by weight of 3,3,3-trifluoro-2-trifluoromethylpropene and from 98 to 35 percent by weight of an acrylic acid ester having the general formula:

$$H_2C=CH-\overset{O}{\underset{\|}{C}}-O-R_5$$

wherein $R_5$ represents a lower alkyl radical containing from 1 to 8 carbon atoms.

13. A copolymer according to claim 12 wherein the acrylic acid ester is ethyl acrylate.

14. A process for preparing a polymeric composition which comprises polymerizing a monomeric mixture of 3,3,3-trifluoro-2-trifluoromethylpropene and at least one monomer selected from the group consisting of (a) vinyl esters having the general formula:

$$H_2C=CH-O-\overset{O}{\underset{\|}{C}}-R$$

wherein R represents a lower alkyl radical containing from 1 to 7 carbon atoms, (b) vinyl ethers having the general formula:

$$H_2C=CH-O-R_1$$

wherein $R_1$ represents an alkyl radical containing from 2 to 4 carbon atoms, (c) vinyl aromatic compounds having the general formula:

$$H_2C=CH-R_2$$

wherein $R_2$ represents an aromatic hydrocarbon of the benzene series, (d) vinyl halides having the general formula:

$$H_2C=CH-R_3$$

wherein $R_3$ represents a halogen atom selected from the group consisting of chlorine, bromine and fluorine, (e) vinyl ketones having the general formula:

$$H_2C=\overset{R_4}{\underset{|}{C}}-\overset{O}{\underset{\|}{C}}-CH_3$$

wherein $R_4$ represents a member of the group consisting of hydrogen and the methyl radical, and (f) esters of acrylic acid having the general formula:

$$H_2C=CH-\overset{O}{\underset{\|}{C}}-O-R_5$$

wherein $R_5$ represents a lower alkyl radical containing from 1 to 8 carbon atoms, said mixture containing between about 2 and 65 percent by weight of 3,3,3-trifluoro-2-trifluoromethylpropene and correspondingly from about 98 to 35 percent by weight of at least one of the monomers (a), (b), (c), (d), (e) and (f), in an aqueous emulsion at temperatures between about 0° and 100° C. in the presence of a free radical-forming polymerization promotor.

References Cited by the Examiner
UNITED STATES PATENTS

| | | | |
|---|---|---|---|
| 2,549,935 | 4/1951 | Sauer | 260—63 |
| 2,626,252 | 1/1953 | Tawney | 260—87.7 X |
| 2,975,164 | 3/1961 | Crawford et al. | 260—87.5 |
| 3,089,866 | 5/1963 | Crawford | 260—87.7 XR |

LEON J. BERCOVITZ, *Primary Examiner.*

H. N. BURSTEIN, *Examiner.*